United States Patent
Jones et al.

(10) Patent No.: US 9,779,361 B2
(45) Date of Patent: Oct. 3, 2017

(54) METHOD FOR LEARNING EXEMPLARS FOR ANOMALY DETECTION

(71) Applicant: Mitsubishi Electric Research Laboratories, Inc., Cambridge, MA (US)

(72) Inventors: Michael J Jones, Belmont, MA (US); Daniel Nikolaev Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 601 days.

(21) Appl. No.: 14/296,809

(22) Filed: Jun. 5, 2014

(65) Prior Publication Data

US 2015/0356421 A1 Dec. 10, 2015

(51) Int. Cl.
G06N 99/00 (2010.01)

(52) U.S. Cl.
CPC .................. G06N 99/005 (2013.01)

(58) Field of Classification Search
None
See application file for complete search history.

(56) References Cited

U.S. PATENT DOCUMENTS

| | | | |
|---|---|---|---|
| 2005/0039086 A1* | 2/2005 | Krishnamurthy | H04L 41/142 714/57 |
| 2006/0085854 A1* | 4/2006 | Agrawal | G06F 21/552 726/23 |
| 2011/0119226 A1* | 5/2011 | Ruhl | G06F 17/3089 706/52 |
| 2012/0316835 A1 | 12/2012 | Maeda et al. | |
| 2013/0080375 A1 | 3/2013 | Viswanathan et al. | |
| 2013/0318011 A1* | 11/2013 | Jones | G06F 11/07 706/12 |
| 2014/0031060 A1* | 1/2014 | Bensley | G06F 17/2785 455/456.1 |
| 2014/0039274 A1 | 2/2014 | Sarrafzadeh et al. | |
| 2014/0108324 A1* | 4/2014 | Chen | G06F 17/18 706/52 |

(Continued)

FOREIGN PATENT DOCUMENTS

| | | |
|---|---|---|
| CN | 102664006 | 9/2012 |
| CN | 102831442 | 12/2012 |
| JP | 2013246729 | 12/2013 |

OTHER PUBLICATIONS

Angiulli et al, Detecting Distance-Based Outliers in Streams of Data, 2007.*

(Continued)

Primary Examiner — Stanley K Hill
Assistant Examiner — Mikayla Chubb
(74) Attorney, Agent, or Firm — Gene Vinokur; Hironori Tsukamoto; James McAleenan

(57) ABSTRACT

A method detects anomalies in time series data, by first learning a final set of exemplars by summarizing training time series data using a divide-and-conquer procedure. Then, for each window of testing time series data, a distance to a nearest exemplar in the final set of exemplars is determined, wherein the distance is an anomaly score. Finally, an anomaly is signaled when the anomaly score for a window is greater than a threshold.

8 Claims, 2 Drawing Sheets

(56) References Cited

U.S. PATENT DOCUMENTS

| | | | | |
|---|---|---|---|---|
| 2015/0006972 A1* | 1/2015 | Jones | ............... | G06F 11/0736 |
| | | | | 714/47.2 |
| 2015/0051847 A1* | 2/2015 | Angello | ............ | F01D 21/003 |
| | | | | 702/35 |
| 2015/0235139 A1* | 8/2015 | Sharma | ............... | G06N 5/043 |
| | | | | 706/58 |
| 2015/0269050 A1* | 9/2015 | Filimonov | ......... | G06F 11/3409 |
| | | | | 702/183 |
| 2015/0333998 A1* | 11/2015 | Gopalakrishnan | ...... | H04L 43/16 |
| | | | | 370/244 |
| 2015/0341246 A1* | 11/2015 | Boubez | ............ | H04L 43/0876 |
| | | | | 709/224 |
| 2016/0164721 A1* | 6/2016 | Zhang | ............... | H04L 41/142 |
| | | | | 709/224 |

OTHER PUBLICATIONS

Keogh et al, Hot Sax: Efficiently Finding the Most Unusual Time Series Subsequence, 2005.*

Piciarelli et al, On-line trajectory clustering for anomalous events detection, 2006.*

Chiu, Keogh and Lonardi, "Probabilistic Discovery of Time Series Motifs," SIGKDD 2003.

Mahoney et al., "Trajectory Boundary Modeling of Time Series for Anomaly Detection," Workshop on Data Mining Methods for Anomaly Detection at KDD, 2005.

Ma et al., "Online Novelty Detection on Temporal Sequences," SIGKDD 2003.

Keogh et al., "Hot Sax: Finding the Model Unusual Time Series Subsequence: Algorithms and Applications," ICDM 2005.

* cited by examiner

METHOD FOR LEARNING EXEMPLARS FOR ANOMALY DETECTION

FIELD OF THE INVENTION

This invention relates generally to signal processing, and more particularly to detecting anomalies in real-valued time series data.

BACKGROUND OF THE INVENTION

Time series data can be generated and analyzed for a number of applications. For example, automatic equipment monitoring can avoid costly repairs of industrial equipment. This can be done by analyzing time series data acquired by sensors on or near the equipment to detect anomalies that may indicate that maintenance or repair of the equipment is needed.

Therefore, it is desired to efficiently learn a model of one-dimensional time series data. Then, the model can be used to detect anomalies in future testing time series data from the same source. Typically, the model is learned from a training time series without anomalies.

A number of methods for learning models of time series data are known. A simple and effective method uses the entire training time series data as the model. In other words, the entire training time series is stored as the model. Hence, the time to train is negligible. To detect anomalies, each window of the testing time series is compared to every window of the training time series, and a distance to a nearest matching window is used as an anomaly score. If the anomaly score is above a threshold, then an anomaly is signaled, see Keogh et al., "HOT SAX: Finding the Model Unusual Time Series Subsequence: Algorithms and Applications," ICDM 2005. The main drawback of that approach is that it requires storing the entire training time series, which may be very large, and the computation of the anomaly scores is slow, which may preclude using that method for real-time applications, and with a wide range of different types of time series data.

Another class of methods for modeling time series data uses predictive techniques. Such methods use a number of previous values of the time series data to predict a current value, see Ma et al., "Online Novelty Detection on Temporal Sequences," SIGKDD 2003, and Koskivaara, "Artificial Neural Networks for Predicting Patterns in Auditing Monthly Balances, J. of the Operational Research Society, 1996.) Although those predictive models can be compact, the models may not accurately predict some time series data.

Another method for modeling time series data is as a trajectory through a d-dimensional feature space. Piecewise linear paths or boxes in the d-dimensional space have been used to efficiently represent valid paths in the training time series data, see Mahoney et al., "Trajectory Boundary Modeling of Time Series for Anomaly Detection," Workshop on Data Mining Methods for Anomaly Detection at KDD, 2005. That method for learning has a complexity of O(nlogn).

A slightly different approach determines a subspace for representing short windows of time series data, and then models trajectories in the subspace with an autoregressive model or a density estimation, see Liu et al., "Modeling Heterogeneous Time Series Dynamics to Profile Big Sensor Data in Complex Physical Systems," IEEE Conf. on Big Data, 2013.

U.S. patent application Ser. No. 13/932,238, Method for Detecting Anomalies in a Time Series Data with Trajectory and Stochastic Components," filed by Jones et al. on Jul. 1, 2013 describes a method to detect anomalies in time series data by comparing universal features extracted from testing time series data with the universal features acquired from training time series data to determine a score. The universal features characterize trajectory components of the time series data and stochastic components of the time series data. Then, an anomaly is detected if the anomaly score is above a threshold. A method for efficiently learning a set of universal features (which are a type of exemplar) from training time series is not disclosed in that patent application.

Therefore, there is a need to efficiently learn accurate and compact models for time series that can be applied to many different types of time series data.

SUMMARY OF THE INVENTION

The embodiments of the invention provide a method for detecting efficiently and accurately anomalies in one-dimensional time series data using a model learned from training time series data.

The main idea of the invention is to model the training time series data as a set of exemplars. The exemplars represent a variety of different windows or subsequences in the time series data. A final set of exemplars is substantially smaller than a total set of overlapping windows in the training time series data.

The exemplar learning procedure uses the idea of divide-and-conquer to partition the time series data into smaller chunks, learn a set of exemplars for each chunk, and then combine the results. The resulting exemplar learning procedure has a complexity of $O(nw)$ time (in the average case) where n is a size of the training time series data and w is a size of the window.

The resulting set of exemplars makes anomaly detection very fast because the training time series data are efficiently summarized by a relatively small number of exemplars. Furthermore, the learned model yields a very accurate anomaly detection method for a wide variety of different time series data.

DETAILED DESCRIPTION OF THE EMBODIMENTS

Anomaly Detection Method

Figure 1:
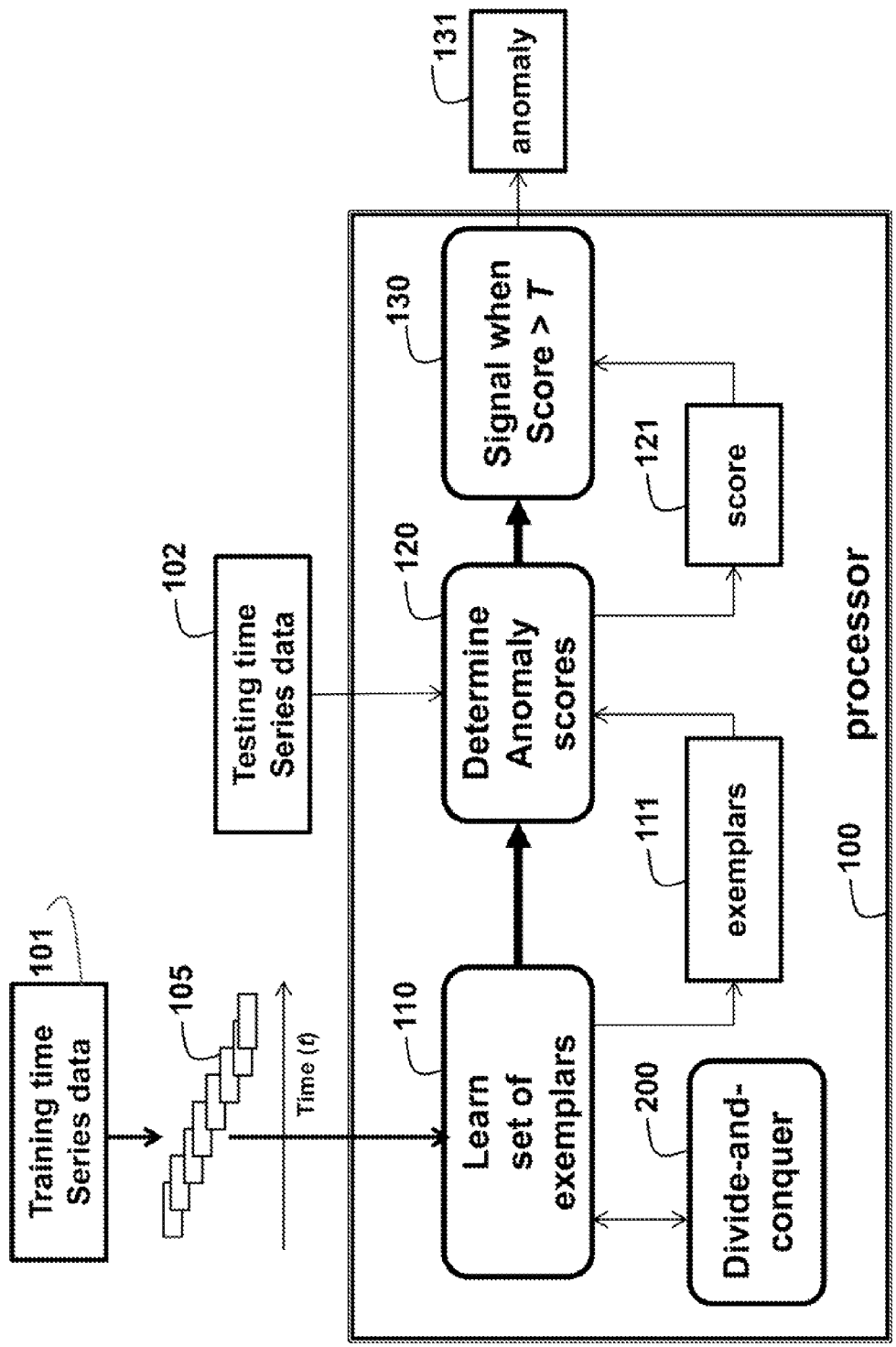
FIG. 1 is a flow diagram of a method for detecting anomalies in times data according to embodiments of the invention.

FIG. 1 shows a method for detecting anomalies in time series data. Steps of the method can be performed in a processor 100 connected to memory and input/output interfaces by buses as known in the art.

Figure 2:
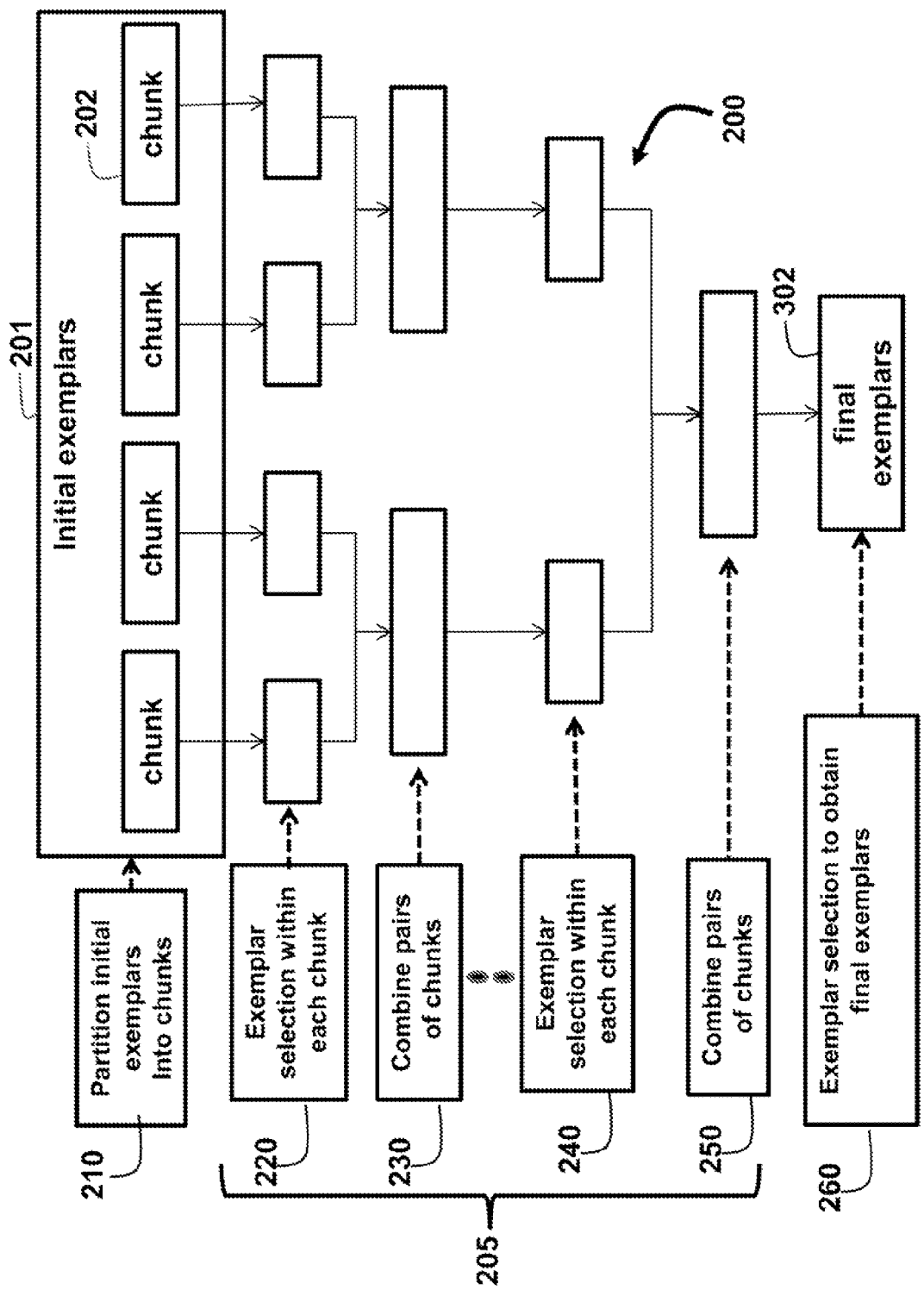
FIG. 2 is a schematic of a divide-and-conquer procedure for learning a set of anomalies according to embodiments of the invention

A set of exemplars 111 is learned by summarizing training time series data 101 using a divide-and-conquer procedure 200. An exemplar is a representation of a set of similar windows of the time series data. The details of the divide-and-conquer procedure are shown in FIG. 2.

For each window of a testing time series data 102, a distance to a nearest exemplar is determined 120. The distance is used as an anomaly score 121.

Then, an anomaly 131 is signaled 130 when the anomaly score for the window is greater than a threshold T.

Divide-and-Conquer Procedure

As shown in FIG. 2, the divide-and-conquer procedure partitions an initial set of exemplars 201 into chunks 202. Then, a sequence 205 of selection and combine procedures, 220 230, 240 250, are applied to chunks. A selection procedure selects a smaller set of exemplars from a given set of exemplars. The smaller set of exemplars is chosen to represent well the given set. An example of a simple selection procedure iteratively merges the two nearest exemplars in a chunk until the smallest nearest neighbor distance between the exemplars in the chunk is greater than the threshold T.

A combine procedure simply puts all of the exemplars from two chunks into one chunk. This process 205 of selecting and combining continues until a single chunk remains. Then, a last selection operation 260 produces a final set of exemplars 203.

Statistical and Smoothed Trajectory (SST) Features

A window of the time series data is represented as a trajectory component that characterizes the shape of the time series data within the window, and a statistical component that characterizes the stochastic component. The windows are time-wise sliding and overlapping. The feature vector including the trajectory and statistical components is called a statistical and smoothed trajectory (SST) feature.

Given a set of SST features representing a set of similar windows of the time series data, we determine an exemplar for this set by a mean trajectory component and a mean statistical component, along with a standard deviation for each element of the trajectory and statistical components.

Our procedure for learning a set of exemplars that summarize the training time series data includes the following steps.

Determine SST feature vectors for each overlapping window in the training time series data and define the initial set of exemplars 201 equal to the set of all SST feature vectors.

We perform the initial merging 220 of exemplars for similar overlapping windows.

We further compress the initial set of exemplars using the divide-and-conquer learning procedure 200.

Each of these steps is described in more detail below.

Feature Vector

The computation of the initial set of exemplars, which is equal to the initial set of SST features is straightforward. We use the sliding windows 105, and within each window the trajectory and statistical components are determined. The trajectory component is determined using a simple fixed window running average of the time series values within the window to yield a smoothed time series data after subtracting the mean of the window.

Because of smoothing, half of the values in the smoothed time series data can be discarded without losing important information. This yields a trajectory component with w/2 elements. The statistical component is a small set of statistics determined over the time series data values in the window, which are designed to characterize stochastic information in the initial time series window.

The statistics components include a mean, a standard deviation, a mean of an absolute difference, a number of mean crossings divided by a window size, a percentage of positive differences, a percentage of zero differences, and an average size of a sequence of positive differences divided by the window size.

Combining the trajectory and statistical components into a single feature vector yields a vector of w/2+7 real values.

The initial set of exemplars is set equal to the initial set of SST feature vectors, with the standard deviation components all set to 0.

Because overlapping subsequences often have small distances between the sequences, we reduce the size of the initial exemplar set by merging the SST feature vectors of similar overlapping sequences. To merge two SST feature vectors, we take a weighted average of the two vectors. The weight for each feature vector is the number of feature vectors that have already been averaged into the feature vector.

After the initial merging 210, we use the divide-and-conquer procedure 200 to efficiently select the final set of exemplars 203. The divide-and-conquer procedure partitions 210 the initial set of exemplars 201 into chunks of size C, where C is a parameter of the procedure. For each chunk, an selection procedure is run. In one embodiment, the selection procedure that is run on each chunk is the iterative merging procedure. The iterative merging procedure first finds a nearest neighbor exemplar in the chunk for each exemplar in the chunk. The procedure uses the distance function $$dist(v_1, v_2) = \sum_{i=1}^{l} (v_1 \cdot t(i) - v_2 \cdot t(i))^2 + \frac{l}{7} \sum_{i=1}^{7} (v_1 \cdot s(i) - v_2 \cdot s(i))^2 \quad (1)$$

where $v_1$ and $v_2$ are two feature vectors, $v_j \cdot t$ is the trajectory component of $v_j$ and $v_j \cdot s$ is the statistical component of $v_j$. The computation of the distance function uses early abandoning which means it ends computation early if the partial sum is already greater than the distance of the nearest neighbor so far The two exemplars with the smallest distance between them are merged. Merging two exemplars consists of computing a weighted average of the two exemplars, where the weight for an exemplar is equal to the number of exemplars that have already been averaged into it. The nearest neighbor of the merged exemplar within the chunk is determined, and any other exemplars that have one of the two exemplars as a nearest neighbor have their nearest neighbors recalculated.

This process of merging the two nearest exemplars continues until the smallest nearest neighbor distance for all remaining exemplars in the chunk is greater than the threshold T. At that point, the selection procedure terminates and returns the remaining set of exemplars for the chunk.

In another embodiment, the selection procedure that is run on each chunk is a conventional clustering algorithm, such as k-means clustering.

After the selection procedure has been applied to each chunk, pairs of chunks are combined into one new chunk by simply putting all exemplars from the two chunks into one new chunk. The selection procedure is then run on each of the new chunks, and then these chunks are combined, and so on, until there is only one chunk remaining. A final selection procedure is performed on the one remaining chunk to yield a final set of exemplars for the whole training set. This is the final set of exemplars returned by the hierarchical exemplar learning procedure as shown in FIG. 2.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting anomalies in time series data representing an operation of a machine, comprising the steps of:
   learning a final set of exemplars by summarizing training time series data using a divide-and-conquer procedure:
   determining, for each window of testing time series data, a distance to a nearest exemplar in the final set of exemplars, wherein the distance is an anomaly score; and
   signaling an anomaly to a user when the anomaly score for a window is greater than a threshold, wherein the divide- and conquer procedure further comprises:
   partitioning an initial set of exemplars in the training time series data into chunks;
   applying a sequence of selection procedures and combine procedures to the chunks until only one chunk remains; and
   applying a last selection procedure to the exemplars of the remaining chunk to produce the final set of exemplars, wherein the steps are performed in a processor.

2. The method of claim 1, wherein each exemplar represents a set of similar windows of the time series data.

3. The method of claim 1, wherein each window of the time series data is represented as a trajectory component that characterizes a shape of the time series data within the window, and a statistical component that characterizes a stochastic component, and a feature vector including the trajectory and statistical components is a statistical and smoothed trajectory (SST) feature, and wherein the windows are time-wise sliding and overlapping.

4. The method of claim 3, further comprising:
   determine the SSTs features for each window in the training time series data and define the initial set of exemplars equal to a set of all SST features.

5. The method of claim 1, further comprising:
   smoothing the time series data.

6. The method of claim 4, wherein the statistical component includes a mean, a standard deviation, a mean of an absolute difference, a number of mean crossings divided by a window size, a percentage of positive differences, a percentage of zero differences, and an average size of a sequence of positive differences divided by a size of the window.

7. The method of claim 4, wherein the selection procedure iteratively merges nearest neighbor exemplars, and where merging of the exemplars is done by computing an average of the SST features.

8. The method of claim 6, wherein the distance is $$dist(v_1, v_2) = \sum_{i=1}^{l} (v_1 \cdot t(i) - v_2 \cdot t(i))^2 + \frac{l}{7}\sum_{i=1}^{7} (v_1 \cdot s(i) - v_2 \cdot s(i))^2,$$

where $v_1$ and $v_2$ are two feature vectors, $v_j \cdot t$ is the trajectory component of $v_j$ and $v_j\text{---}.s$ is the statistical component of $v_j$.

* * * * *